US012080222B2

(12) United States Patent
Park et al.

(10) Patent No.: US 12,080,222 B2
(45) Date of Patent: Sep. 3, 2024

(54) DISPLAY APPARATUS

(71) Applicant: LG Display Co., Ltd., Seoul (KR)

(72) Inventors: Yongjin Park, Paju-si (KR); Duhyeon Baek, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/051,047

(22) Filed: Oct. 31, 2022

(65) Prior Publication Data

US 2023/0206820 A1 Jun. 29, 2023

(30) Foreign Application Priority Data

Dec. 24, 2021 (KR) ........................ 10-2021-0187071

(51) Int. Cl.
*G09G 3/20* (2006.01)
*G09G 3/32* (2016.01)
*G09G 3/36* (2006.01)

(52) U.S. Cl.
CPC ............. *G09G 3/2096* (2013.01); *G09G 3/32* (2013.01); *G09G 3/36* (2013.01); *G09G 2300/0819* (2013.01); *G09G 2300/0842* (2013.01); *G09G 2310/0278* (2013.01); *G09G 2310/08* (2013.01); *G09G 2320/0252* (2013.01); *G09G 2330/021* (2013.01); *G09G 2330/028* (2013.01)

(58) Field of Classification Search
CPC ......... G06F 2213/0042; G06F 13/4081; G06F 3/041; G06F 3/044; H04L 25/028; G09G 3/2096; G09G 3/32; G09G 3/36; G09G 2300/0819; G09G 2300/0278; G09G 2310/08; G09G 2320/0252; G09G 2330/021; G09G 2330/028; G09G 3/20
See application file for complete search history.

(56) References Cited

U.S. PATENT DOCUMENTS

2009/0121997 A1* 5/2009 Jo ............................ G09G 3/20 345/99
2013/0076703 A1* 3/2013 Baek .................... G09G 3/2092 345/204

(Continued)

FOREIGN PATENT DOCUMENTS

KR 2007-0007645 A 1/2007
KR 2008-0105645 A 12/2008

*Primary Examiner* — Michael A Faragalla
(74) *Attorney, Agent, or Firm* — POLSINELLI PC

(57) ABSTRACT

A display apparatus includes a display panel including data lines, first to $n^{th}$ data driver integrated circuits (ICs) (n being a natural number greater than 1) supplying data voltages to the data lines, a controller controlling the first to $n^{th}$ data driver ICs, and a power supply supplying power to the first to $n^{th}$ data driver ICs, the first data driver IC includes a lock signal switching unit receiving or blocking a lock signal from the power supply, a pull-up resistor is provided between the second data driver IC and a lock signal line to which the lock signal is supplied from the power supply, and the lock signal supplied to the first data driver IC or the second data driver IC is transferred to the controller through the first to $n^{th}$ data driver ICs.

19 Claims, 9 Drawing Sheets

(56) References Cited

U.S. PATENT DOCUMENTS

| | | | | |
|---|---|---|---|---|
| 2018/0323785 | A1* | 11/2018 | Suma Vinay ...... | H03K 19/0008 |
| 2019/0044553 | A1* | 2/2019 | Bunce ................... | G06F 1/3228 |
| 2019/0319447 | A1* | 10/2019 | Mukhopadhyay .. | G06F 13/4295 |
| 2020/0098330 | A1* | 3/2020 | Pyun ......................... | G06F 1/08 |
| 2020/0193884 | A1* | 6/2020 | Kim ....................... | G09G 5/008 |
| 2021/0280110 | A1* | 9/2021 | Kim ......................... | G09G 3/20 |

* cited by examiner

DISPLAY APPARATUS

CROSS-REFERENCE TO RELATED APPLICATION

This application claims the priority of Korean Patent Application No. 10-2021-0187071 filed on Dec. 24, 2021, which is hereby incorporated by reference in its entirety.

BACKGROUND

Field of the Disclosure

The present disclosure relates to a display apparatus.

Description of the Background

In display apparatuses, in order to synchronize driving timings of data driver integrated circuits (ICs), a lock signal is continuously transferred to the data driver ICs while an image is being displayed.

In display apparatuses, in a case where the same images are continuously displayed based on the same image data, a controller may not transfer the image data to the data driver ICs. Such an operation mode is referred to as a low power Tx driving (LPTD) mode. In this case, the lock signal is not transferred to the data driver ICs also.

Subsequently, when pieces of image data are changed, the controller synchronizes the data driver ICs by using the lock signal, and then, transfers the pieces of image data to the data driver ICs.

In this case, a transfer speed of the lock signal is reduced due to a parasitic capacitance occurring in the data driver ICs and a parasitic capacitance occurring in a line through which the lock signal is transferred. Therefore, delay of the lock signal occurs.

Therefore, after the LPTD mode ends, an image which should be first output may not normally be output, and due to this, the quality of display apparatuses may be degraded.

SUMMARY

Accordingly, the present disclosure is to provide a display apparatus that substantially obviates one or more problems due to limitations and disadvantages described above.

More specifically, the present disclosure is to provide a display apparatus which can increase a transfer speed or the amount of current of a lock signal, thereby preventing delay of the lock signal.

Additional advantages and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve these and other advantages and in accordance with the purpose of the disclosure, as embodied and broadly described herein, a display apparatus includes a display panel including data lines, first to $n^{th}$ data driver integrated circuits (ICs) (where n is a natural number of more than 1) supplying data voltages to the data lines, a controller controlling the first to $n^{th}$ data driver ICs, and a power supply supplying power to the first to $n^{th}$ data driver ICs, wherein the first data driver IC includes a lock signal switching unit receiving or blocking a lock signal from the power supply, a pull-up resistor is provided between the second data driver IC and a lock signal line to which the lock signal is supplied from the power supply, and the lock signal supplied to the first data driver IC or the second data driver IC is transferred to the controller through the first to $n^{th}$ data driver ICs.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the present disclosure and are incorporated in and constitute a part of this application, illustrate aspects of the disclosure and together with the description serve to explain the principle of the disclosure.

In the drawings.

DETAILED DESCRIPTION

Figure 1:
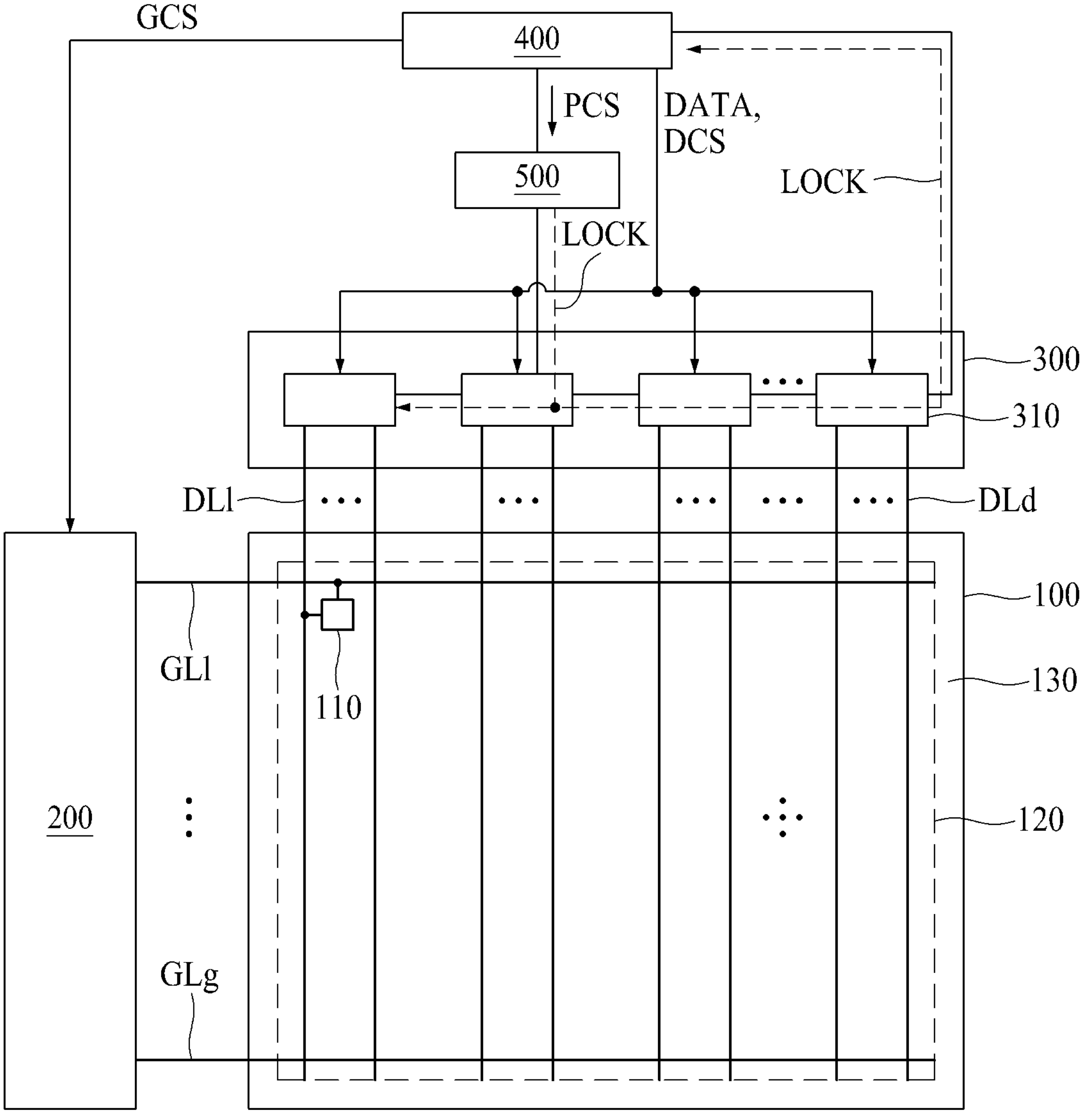
FIG. 1 is an exemplary diagram illustrating a configuration of a display apparatus according to the present disclosure.

Reference will now be made in detail to the exemplary aspects of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When “comprise,” “have,” and “include” described in the present specification are used, another part may be added unless “only” is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, “on,” “over,” “under,” and “next,” one or more other parts may be disposed between the two parts unless a more limiting term, such as “just” or “direct(ly)” is used.

In describing a time relationship, for example, when the temporal order is described as, for example, “after,” “subsequent,” “next,” and “before,” a case that is not continuous may be included unless a more limiting term, such as “just,” “immediate(ly),” or “direct(ly)” is used.

It will be understood that, although the terms “first,” “second,” etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms “first,” “second,” “A,” “B,” “(a),” “(b),” etc. may be used. These terms are intended to identify the corresponding elements from the other elements, and basis, order, or number of the corresponding elements should not be limited by these terms. The expression that an element is “connected,” “coupled,” or “adhered” to another element or layer the element or layer can not only be directly connected or adhered to another element or layer, but also be indirectly connected or adhered to another element or layer with one or more intervening elements or layers “disposed,” or “interposed” between the elements or layers, unless otherwise specified.

The term “at least one” should be understood as including any and all combinations of one or more of the associated listed items. For example, the meaning of “at least one of a first item, a second item, and a third item” denotes the combination of all items proposed from two or more of the first item, the second item, and the third item as well as the first item, the second item, or the third item.

Features of various aspects of the present disclosure may be partially or overall coupled to or combined with each other, and may be variously inter-operated with each other and driven technically as those skilled in the art can sufficiently understand. The aspects of the present disclosure may be carried out independently from each other, or may be carried out together in co-dependent relationship.

Hereinafter, aspects of the present disclosure will be described in detail with reference to the accompanying drawings.

Figure 2:
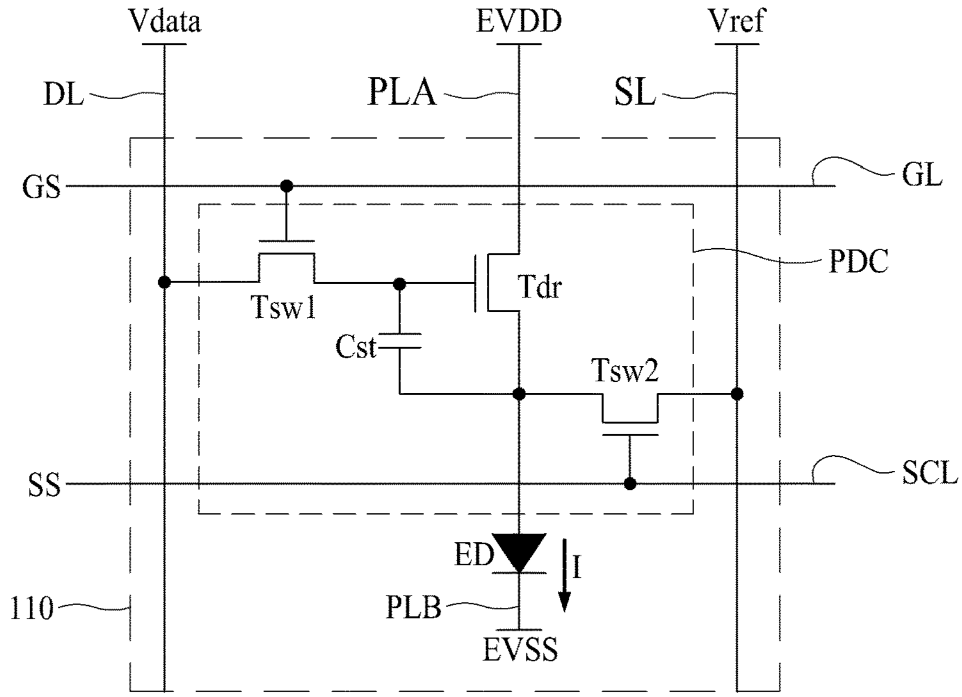
FIG. 2 is an exemplary diagram illustrating a structure of a pixel applied to a display apparatus according to the present disclosure.
Figure 3:
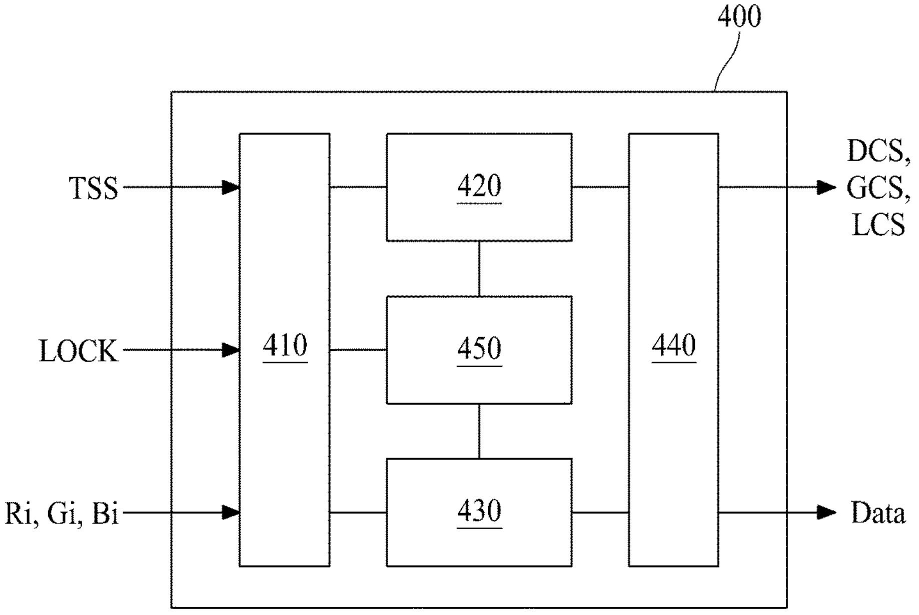
FIG. 3 is an exemplary diagram illustrating a configuration of a controller applied to a display apparatus according to the present disclosure.

FIG. 1 is an exemplary diagram illustrating a configuration of a display apparatus according to the present disclosure. FIG. 2 is an exemplary diagram illustrating a structure of a pixel applied to the display apparatus according to the present disclosure. FIG. 3 is an exemplary diagram illustrating a configuration of a controller applied to the display apparatus according to the present disclosure.

The display apparatus according to the present disclosure may configure various electronic devices. The electronic devices may include, for example, smartphones, tablet personal computers (PCs), televisions (TVs), and monitors.

The display apparatus according to the present disclosure, as illustrated in FIG. 1, may include a display panel 100 which includes a display area 120 displaying an image and a non-display area 130 provided outside the display area 120, a gate driver 200 which supplies a gate signal to a plurality of gate lines GL1 to GLg provided in the display area 120 of the display panel 100, a data driver 300 which supplies data voltages to a plurality of data lines DL1 to DLd provided in the display panel 100, a controller 400 which controls driving of the gate driver 200 and the data driver 300, and a power supply 500 which supplies power to the controller, the gate driver, the data driver, and the display panel.

In the display apparatus according to the present disclosure, as illustrated in FIG. 1, the data driver 300 may include at least two data driver integrated circuits (ICs) 310. The at least two data driver ICs 310 may supply data voltages to the data lines DL1 to DLd.

In the present disclosure, the controller 400 may transfer pieces of image data to the data driver ICs 310. Such a scheme may be referred to as an embedded clock point-point interface (hereinafter simply referred to as “EPI”).

In a display apparatus using the EPI, when the display apparatus is turned on, the data driver ICs 310 may be synchronized by a lock signal. When the lock signal is normally received, the display apparatus may transfer pieces of image data Data to the data driver ICs 310, and thus, the display panel 100 may display an image.

In the display apparatus using the EPI, the lock signal may be continuously transferred to the controller 400 via the data driver ICs 310 while an image is being displayed. Accordingly, whether the data driver ICs 310 are synchronized may be determined.

The lock signal may be supplied to at least one of the data driver ICs 310.

Hereinafter, basic elements of the display apparatus using the EPI will be described.

First, the display panel 100 may include the display area 120 and the non-display area 130. The gate lines GL1 to GLg, the data lines DL1 to DLd, and the pixels 110 may be provided in the display area 120. Accordingly, the display area 120 may display an image. Here, g and d may each be a natural number. The non-display area 130 may surround an outer portion of the display area 120.

The pixel 110 included in the display panel 100, as illustrated in FIG. 2, may include an emission area which includes a pixel driving circuit PDC, including a switching transistor Tsw1, a storage capacitor Cst, a driving transistor Tdr, and a sensing transistor Tsw2, and a light emitting device ED.

A first terminal of the driving transistor Tdr may be connected to a high voltage supply line PLA through which a high voltage EVDD is supplied, and a second terminal of the driving transistor Tdr may be connected to the light emitting device ED.

A first terminal of the switching transistor Tsw1 may be connected to the data line DL, a second terminal of the switching transistor Tsw1 may be connected to a gate of the driving transistor Tdr, and a gate of the switching transistor Tsw1 may be connected to a gate line GL.

A data voltage Vdata may be supplied to the data line DL, and a gate signal GS may be supplied to the gate line GL.

The sensing transistor Tsw2 may be provided for measuring a threshold voltage or mobility of the driving transistor. A first terminal of the sensing transistor Tsw2 may be connected to a second terminal of the driving transistor Tdr and the light emitting device ED, a second terminal of the sensing transistor Tsw2 may be connected to a sensing line SL through which a reference voltage Vref is supplied, and a gate of the sensing transistor Tsw2 may be connected to a sensing control line SCL through which a sensing control signal SS is supplied.

A structure of the pixel 110 applied to the present disclosure is not limited to a structure illustrated in FIG. 2. Accordingly, a structure of the pixel 110 may be changed to various shapes.

Moreover, the present disclosure may be applied to a liquid crystal display (LCD) apparatus including a liquid crystal display panel as well as a light emitting display apparatus including a light emitting device illustrated in FIG. 2. That is, the present disclosure may be applied to various kinds of display apparatuses which are being currently used. Hereinafter, however, for convenience of description, a light emitting display apparatus will be described as an example of the present disclosure.

The data driver 300 may supply data voltages Vdata to the data lines DL1 to DLd.

The data driver 300 may include the at least two data driver ICs 310. Each of the at least two data driver ICs 310 may be connected to at least one data line DL.

Each of the at least two data driver ICs 310 may receive pieces of image data Data, corresponding to data lines connected thereto, from the controller 400, convert the received image data Data into data voltages, and supply the data voltages to the data lines.

A lock signal LOCK received by at least one of the at least two data driver ICs 310 may be sequentially supplied to all data driver ICs 310, and then, may be finally received by the controller 400.

The lock signal LOCK may synchronize all data driver ICs 310 and may initialize all data driver ICs 310. When the lock signal is normally received, the controller 400 may determine that all data driver ICs 310 are synchronized and are normally driven.

For example, in the display apparatus illustrated in FIG. 1, the lock signal LOCK supplied to a second data driver IC 310 provided second from a left side may be supplied to a second data driver IC 310 provided first from the left side and a third data driver IC 310 provided third from the left side, and the lock signal LOCK supplied to the third data driver IC 310 provided third from the left side may be sequentially supplied to data driver ICs 310 provided at a right side of the third data driver IC 310. In the display apparatus illustrated in FIG. 1, the lock signal LOCK transferred to a data driver IC provided at a rightmost side may be transferred to the controller 400.

In this case, the lock signal LOCK may initialize all data driver ICs 310.

The controller 400 may realign input video data transferred from an external system by using a timing synchronization signal transferred from the external system and may generate data control signals DCS which are to be supplied to the data driver 300 and gate control signals GCS which are to be supplied to the gate driver 200.

To this end, the controller 400 may include a data aligner 430 which realigns input video data to generate image data Data and supplies the image data Data to the data driver 300, a control signal generator 420 which generates the gate control signal GCS and the data control signal DCS by using the timing synchronization signal, an input unit 410 which receives the timing synchronization signal and the input video data transferred from the external system and respectively transfers the timing synchronization signal and the input video data to the data aligner and the control signal generator, and an output unit 440 which supplies the data driver 300 with the image data Data generated by the data aligner and the data control signal DCS generated by the control signal generator and supplies the gate driver 200 with the gate control signal GCS generated by the control signal generator.

The controller 400 may include a storage unit 450 for storing various information.

The control signal generator 420 may generate a power control signal PCS for controlling the power supply 500. When the power control signal PCS is supplied to the power supply 500, the power supply 500 may supply the lock signal LOCK to at least one of the data driver ICs 310.

The data control signals DCS for controlling the data driver 300 may include a lock control signal LCS for allowing the lock signal to be supplied to at least one of the data driver ICs 310.

The lock signal LOCK may be supplied to the data driver IC 310 which has received the lock control signal LCS.

The external system may perform a function of driving the controller 400 and an electronic device. For example, when the electronic device is a TV, the external system may receive various sound information, video information, and letter information over a communication network and may transfer the received video information to the controller 400. In this case, the image information may include input video data.

The power supply 500 may generate various powers and may supply the generated powers to the controller 400, the gate driver 200, the data driver 300, and the display panel 100.

Moreover, the power supply 500 may supply the lock signal LOCK to at least one of the data driver ICs 310 on the basis of control by the controller 400.

Finally, the gate driver 200 may be configured as an IC and mounted in the non-display area 130. Also, the gate driver 200 may be directly embedded in the non-display area 130 by using a gate in panel (GIP) type. In a case which uses the GIP type, transistors configuring the gate driver 200 may be provided in the non-display area through the same process as transistors included in each of the pixels 110.

The gate driver 200 may supply gate pulses GP1 to GPg to the gate lines GL1 to GLg. When a gate pulse generated by the gate driver 200 is supplied to the switching transistor Tsw1 included in the pixel 110, the switching transistor Tsw1 may be turned on. When the switching transistor Tsw1 is turned on, a data voltage supplied through a data line may be supplied to the pixel 110. When a gate off signal generated by the gate driver 200 is supplied to the switching transistor Tsw1, the switching transistor Tsw1 may be turned off. When the switching transistor Tsw1 is turned off, a data voltage may not be supplied to the pixel 110 any longer. A gate signal GS supplied to the gate line GL may include the gate pulse GP and the gate off signal.

Figure 4:
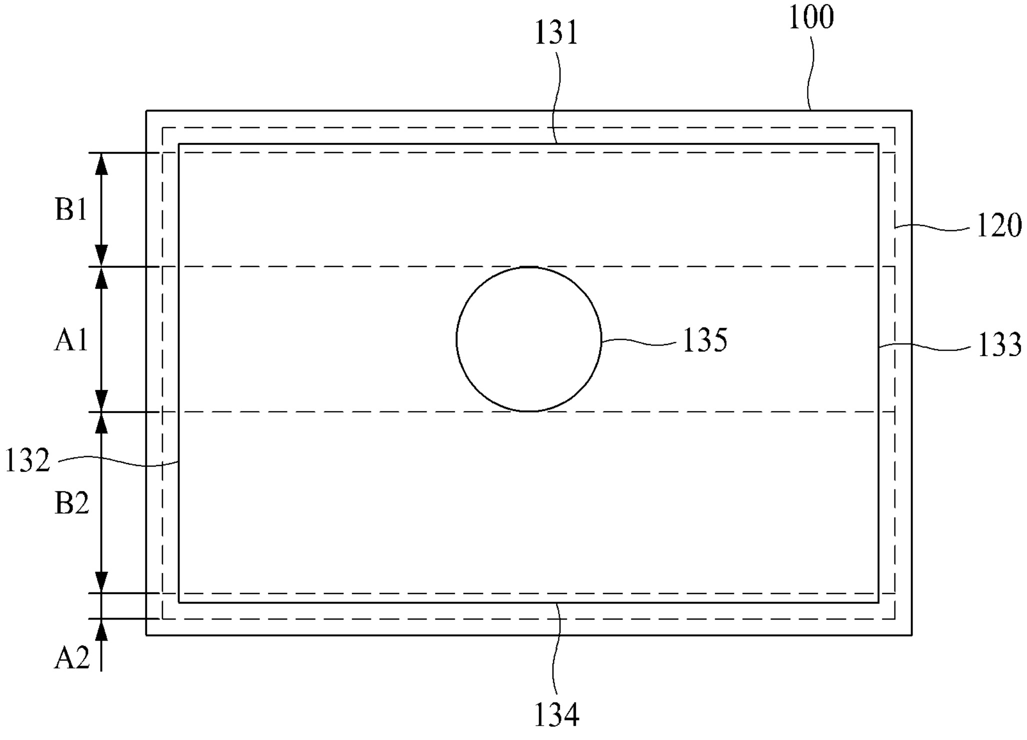
FIG. 4 is an exemplary diagram illustrating a display panel applied to a display apparatus according to the present disclosure.

FIG. 4 is an exemplary diagram illustrating a display panel applied to a display apparatus according to the present disclosure. Hereinafter, a normal mode and a low power Tx driving (LPTD) mode applied to the present disclosure will be described with reference to FIG. 4.

Particularly, in the following description, as illustrated in FIG. 4, the normal mode and the LPTD mode will be described with reference to a display panel where tetragons 131 to 134 and a circle 135 are illustrated.

First, the normal mode may denote a period where pieces of image data are transferred to all data driver ICs 310 by the controller 400, and thus, an image is displayed.

For example, different data voltages should be output to pixels connected to gate lines provided in a region A1, so as to illustrate the circle 135 in FIG. 4. Accordingly, the controller 400 should supply all data driver ICs 310 with pieces of image data Data corresponding to the region A1.

Therefore, the region A1 may correspond to the normal mode.

Second, the LPTD mode may denote a period where pieces of image data are not transferred to all data driver ICs 310 by the controller 400.

For example, the same image data Data may correspond to gate lines provided in a region B1 where only a tetragonal left line 132 and a tetragonal right line 133 among the tetragons 131 to 134 and the circle 135 illustrated in FIG. 4 are provided.

That is, in a case where $n^{th}$ to $m^{th}$ gate lines (where n is a natural number, and m is a natural number which is more than n) are provided in the region B1, pieces of image data Data corresponding to the $n^{th}$ to $m^{th}$ gate lines may be the same. To provide an additional description, pieces of image data Data corresponding to the $n^{th}$ gate line, pieces of image data Data corresponding to an $n+1^{th}$ gate line, and pieces of image data Data corresponding to the $m^{th}$ gate line may be the same.

In this case, the controller 400 may supply the data driver ICs 310 with the pieces of image data Data corresponding to the $n^{th}$ gate line and may not supply the data driver ICs 310 with the pieces of image data Data corresponding to the $n+1^{th}$ gate line and the pieces of image data Data corresponding to the $m^{th}$ gate line.

To this end, the controller 400 may analyze all input video data received from the external system and may determine that pieces of image data Data corresponding to the $n^{th}$ to $m^{th}$ gate lines are the same, on the basis of an analysis result. When it is determined that the pieces of image data Data corresponding to the $n^{th}$ to $m^{th}$ gate lines are the same, as described above, the controller 400 may supply the data driver ICs 310 with the pieces of image data Data corresponding to the $n^{th}$ gate line and may not supply the data driver ICs 310 with the pieces of image data Data corresponding to the $n+1^{th}$ gate line and the pieces of image data Data corresponding to the $m^{th}$ gate line.

In this case, data voltages Vdata corresponding to the $n^{th}$ gate line may be stored in buffers included in the data driver ICs 310. The data voltages Vdata corresponding to the $n^{th}$ gate line may correspond to the pieces of image data Data corresponding to the $n^{th}$ gate line.

While the gate pulse is being supplied to the $n^{th}$ to $m^{th}$ gate lines, the data driver ICs 310 may continuously output the pieces of image data Data stored in the buffers. Accordingly, images corresponding to the $n^{th}$ to $m^{th}$ gate lines may be the same, and thus, the tetragonal left line 132 and a tetragonal right line 133 may be illustrated in a region B2.

Therefore, the region B2 may correspond to the LPTD mode.

Such an operation may be identically performed in the region B1 illustrated in FIG. 4. Accordingly, the region B1 may also correspond to the LPTD mode.

That is, in the LPTD mode, the same image data Data may not be transferred from the controller 400 to the data driver ICs 310. Accordingly, power consumption of a display apparatus to which the LPTD mode is applied may be reduced compared to power consumption of a display apparatus to which the LPTD mode is not applied.

A tetragonal upper line 131 is illustrated at an upper end of the region B1. In this case, the tetragonal upper line 131 may be illustrated in the normal mode.

A tetragonal lower line 134 is illustrated at a lower end of the region B2. That is, the tetragonal lower line 134 is illustrated in a region corresponding to the $m+1^{th}$ gate line. The tetragonal lower line 134 illustrated at the lower end of the region B2 may differ from the tetragonal left line 132 and the tetragonal right line 133 illustrated in the region B2. [Text]

Therefore, the controller 400 should supply the data driver ICs 310 with pieces of image data Data (i.e., pieces of image data Data corresponding to the $m+1^{th}$ gate line) for illustrating the tetragonal lower line 134. Accordingly, region A2 provided at the lower end of the region B2 may correspond to the normal mode.

In the normal mode, the power supply 500 may transfer the lock signal LOCK to at least one of the data driver ICs 310, on the basis of control by the controller 400.

In the LPTD mode, the power supply 500 may not transfer the lock signal LOCK to the data driver ICs 310, on the basis of control by the controller 400. That is, in the LPTD mode, pieces of image data Data may not be supplied from the controller 400 to the data driver ICs 310, and the lock signal LOCK may not be transferred from the power supply 500 to the data driver ICs 310.

However, when the LPTD is changed to the normal mode, the power supply 500 may transfer the lock signal LOCK to at least one of the data driver ICs 310, on the basis of control by the controller 400.

That is, an image corresponding to the region B2 may be displayed, and the lock signal LOCK may be again supplied to the data driver ICs 310 immediately before the tetragonal lower line 134 is illustrated in a region corresponding to the $m+1^{th}$ gate line. After the lock signal LOCK is supplied, the tetragonal lower line 134 may be displayed in the display panel 100.

When the lock signal LOCK which is not supplied in the LPTD mode is supplied to the data driver ICs 310 when the normal mode is changed to the LPTD mode, a transfer speed of the lock signal LOCK may be reduced due to a parasitic capacitance occurring in the data driver ICs and a parasitic capacitance occurring in a line through which the lock signal is transferred. Therefore, delay of the lock signal occurs.

When delay of the lock signal occurs, a timing at which the pieces of image data Data corresponding to the $m+1^{th}$ gate line is transferred to the data driver ICs 310 may be delayed. Accordingly, in a display apparatus of the related art, the tetragonal lower line 134 may not be illustrated in a region corresponding to the $m^{th}$ gate line.

However, in the display apparatus according to the present disclosure, when the LPTD mode is changed to the normal mode, the lock signal LOCK may not be delayed. Accordingly, in the display apparatus according to the present disclosure, the tetragonal lower line 134 may be accurately illustrated in a region corresponding to the $m+1^{th}$ gate line.

Hereinafter, a structure and method for preventing delay of the lock signal LOCK will be described.

Figure 5:
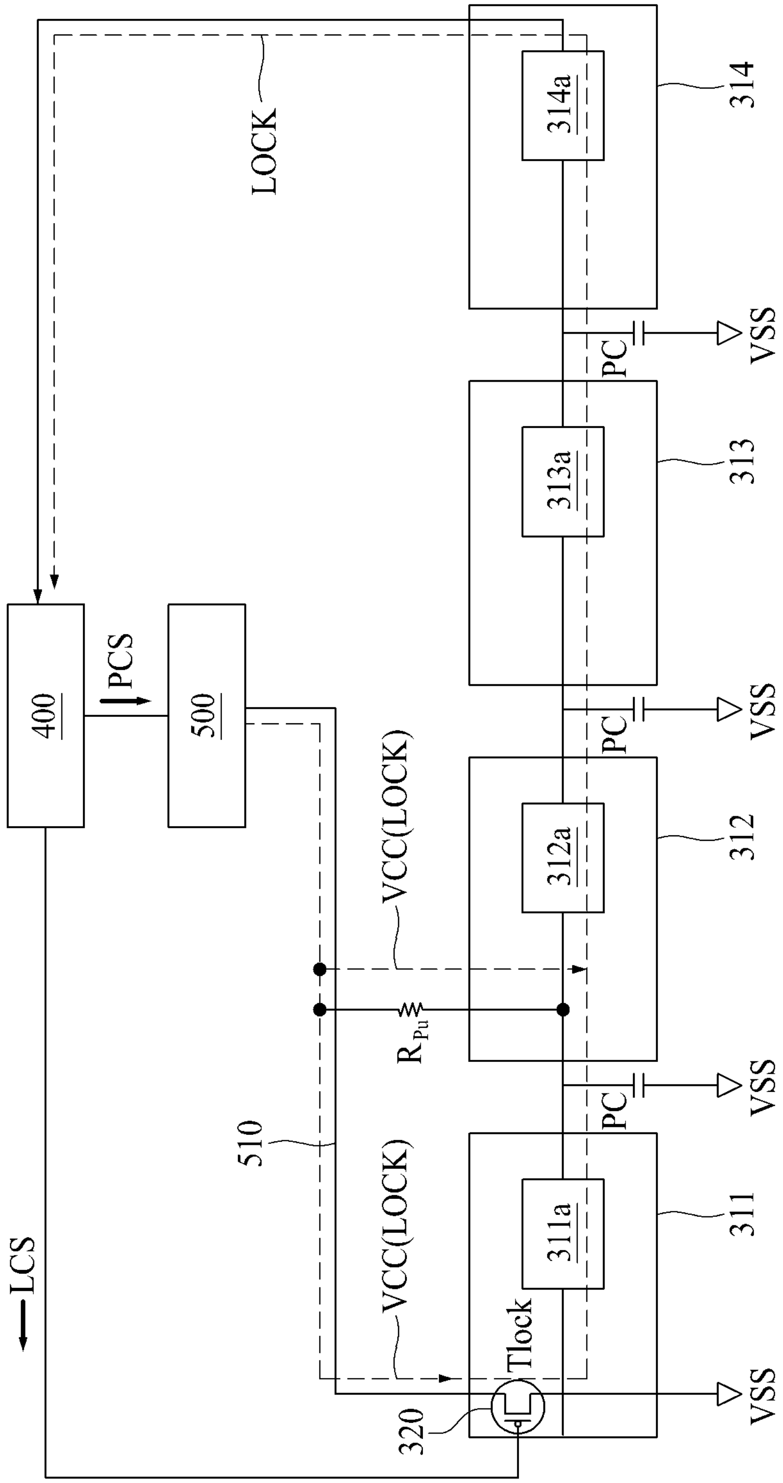
FIGS. 5 and 6 are exemplary diagrams illustrating a structure of each of data driver integrated circuits (ICs) applied to a display apparatus according to the present disclosure.
Figure 6:
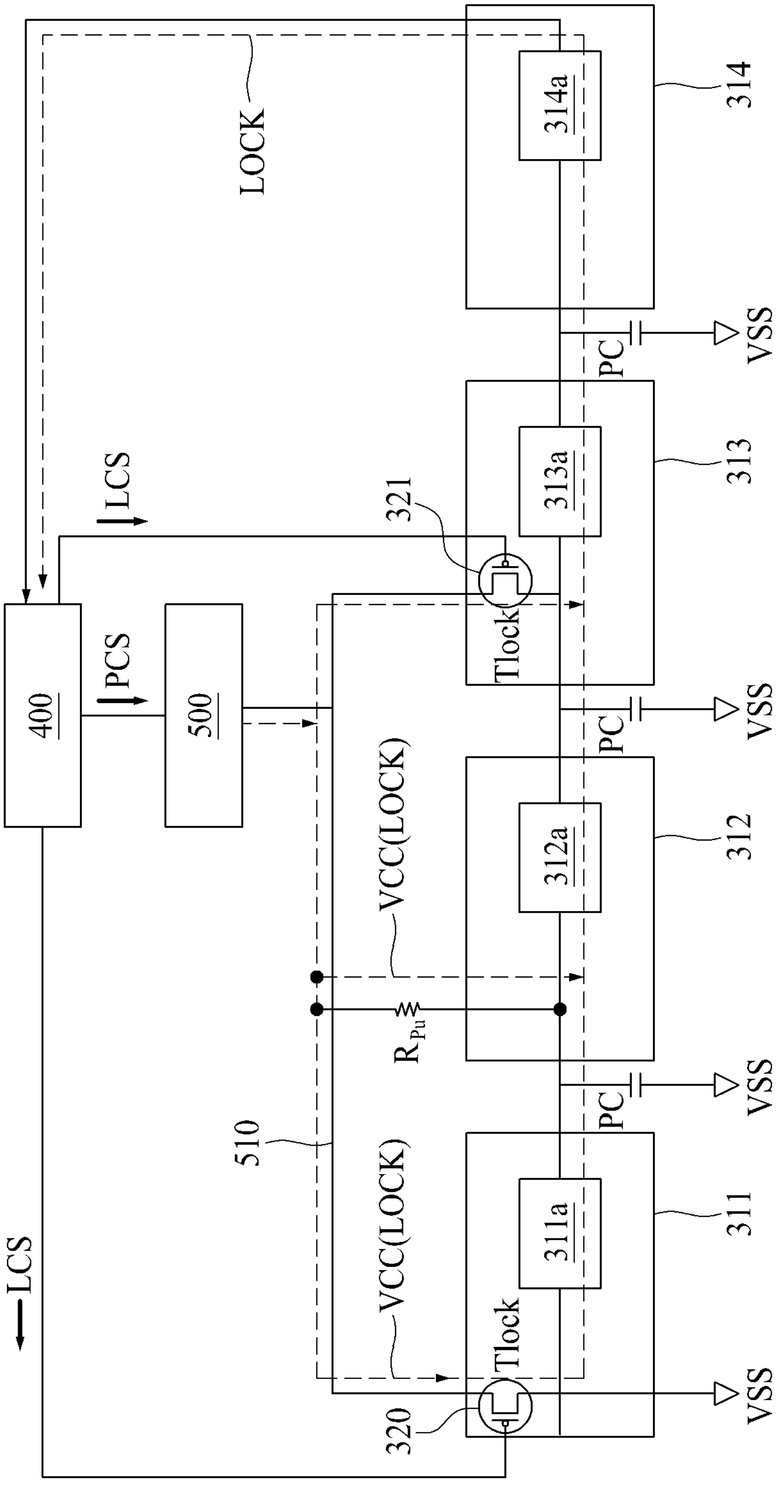

FIGS. 5 and 6 are exemplary diagrams illustrating a structure of each of data driver ICs applied to a display apparatus according to the present disclosure. In FIGS. 5 and 6, reference numerals 311, 312, 313, and 314 refer to data driver ICs. That is, a generic name for data driver ICs is referred to by 310, and first to fourth data ICs are referred to by 311, 312, 313, and 314. Also, elements referred to by 311*a*, 312*a*, 313*a*, and 314*a* may be logic circuit units included in first to fourth data driver ICs 311 to 314. Each of the logic circuit units 311*a*, 312*a*, 313*a*, and 314*a* may perform a basic function of the data driver IC 310. That is, the logic circuit units 311*a*, 312*a*, 313*a*, and 314*a* may perform functions for outputting data voltages to data lines. The logic circuit units 311*a*, 312*a*, 313*a*, and 314*a* may be initialized or synchronized by a lock signal LOCK. Also, a reference numeral PC illustrated in FIGS. 5 and 6 may denote a parasitic capacitance occurring in a line through which the lock signal LOCK is transferred.

The display apparatus according to the present disclosure may include a display panel 100 which includes data lines DL1 to DLd, first to $n^{th}$ data driver ICs 311 (where n is a natural number of more than 1) which transfer data voltages Vdata to the data lines DL1 to DLd, a controller 400 which controls the first to $n^{th}$ data driver ICs, and a power supply 500 which supplies power to the first to $n^{th}$ data driver ICs.

That is, the data driver 300 may include the first to $n^{th}$ data driver ICs. Hereinafter, for convenience of description, as illustrated in FIGS. 5 and 6, a display apparatus where four data driver ICs 310 are provided will be described as an example of the present disclosure. The four data driver ICs 310 may include first to fourth data driver ICs 311 to 314. That is, in the following description, n may be 4.

First, the present disclosure will be described with reference to FIG. 5.

First, the first data driver IC 311 may include a lock signal switching unit 320 which receives or blocks the lock signal LOCK from the power supply 500. Also, a pull-up resistor Rpu may be provided between the second data driver IC 312 and a lock signal line 510 to which the lock signal LOCK is supplied from the power supply 500.

In this case, the lock signal LOCK supplied to the first data driver IC 311 or the second data driver IC 312 may be transferred to the controller 400 through the first to fourth data driver ICs 311 to 314. The lock signal LOCK may be a high voltage VCC generated by the power supply 500.

For example, the lock signal LOCK supplied to the second data driver IC 312 may be supplied to the first data driver IC 311 and the third data driver IC 313, and the lock signal LOCK supplied to the third data driver IC 313 may be supplied to the fourth data driver IC 314. The lock signal LOCK supplied to the fourth data driver IC 314 may be supplied to the controller 400.

Moreover, the lock signal LOCK supplied to the first data driver IC 311 may be supplied to the fourth data driver IC 314 through the second and third data driver ICs 312 and 313, and the lock signal LOCK supplied to the fourth data driver IC 314 may be supplied to the controller 400.

In the normal mode, the lock signal LOCK may be transferred to the second data driver IC 312, and in the LPTD mode, as described above with reference to FIG. 4, the lock signal LOCK may not be transferred to the first to fourth data driver ICs 311 to 314.

In the normal mode, the lock signal LOCK supplied to the second data driver IC 312 may be supplied to the first data driver IC 311 and the third data driver IC 313, the lock signal LOCK supplied to the third data driver IC 313 may be supplied to the fourth data driver IC 314, and the lock signal LOCK supplied to the fourth data driver IC 314 may be supplied to the controller 400.

As described above, the normal mode may denote a period or a mode where pieces of image data are transferred from the controller 400 to the first to fourth data driver ICs 311 to 314.

The LPTD mode may denote a period or a mode where pieces of image data are not transferred to the first to fourth data driver ICs 311 to 314.

Therefore, in the LPTD mode, the display panel may display the same images. For example, in the LPTD mode, as in the region B2 of FIG. 4, the left line 132 and the right line 133 having the same shapes may be illustrated.

Before the normal mode starts after the LPTD mode, the lock signal LOCK may be transferred to the first and second data driver ICs 311 and 312.

A transfer speed of the lock signal LOCK, transferred through the first to fourth data driver ICs 311 to 314 before the normal mode starts after the LPTD mode, may be faster than that of the lock signal LOCK transferred to the first to fourth data driver ICs 311 to 314 in the normal mode.

The reason is because the lock signal LOCK is supplied to the first data driver IC 311 through the lock signal switching unit 320 included in the first data driver IC 311 before the normal mode starts after the LPTD mode.

The lock signal switching unit 320 may include a P type metal oxide semiconductor field effect transistor (PMOSFET) Tlock.

A transfer speed of a current in the PMOSFET Tlock may be faster than that of a current in an N type metal oxide semiconductor field effect transistor (NMOSFET) and various kinds of transistors.

Therefore, a transfer speed of the lock signal LOCK passing through the lock signal switching unit 320 may be faster than that of the lock signal LOCK supplied to the second data driver 312 through the pull-up resistor Rpu.

Therefore, the lock signal LOCK supplied through the first data driver IC 311 before the normal mode starts after the LPTD mode may be transferred to the controller 400 earlier than the lock signal LOCK which is transferred to the controller 400 through the second data driver IC 312 in the normal mode.

Therefore, before the normal mode starts after the LPTD mode, the lock signal LOCK may be transferred to the controller 400, and thus, in the normal mode after the LPTD mode, the display panel may normally display an image.

Finally, the PMOSFET Tlock configuring the lock signal switching unit 320 may be turned on or off by the lock control signal LCS transferred from the controller 400.

To this end, a gate of the PMOSFET Tlock may be connected to the controller 40, and the lock control signal LCS may be supplied to the gate of the PMOSFET Tlock.

That is, when the lock control signal LCS for turning on the PMOSFET Tlock is supplied, the lock signal LOCK may be supplied to the first data driver IC 311, and when the lock control signal LCS for turning off the PMOSFET Tlock is supplied, the lock signal LOCK may not be supplied to the first data driver IC 311.

In this case, the PMOSFET Tlock may be turned on before the normal mode starts after the LPTD mode. Accordingly, the lock signal LOCK transferred through the PMOSFET Tlock may be quickly transferred to the controller 400 through the fourth data driver IC 314.

Second, the present disclosure will be described with reference to FIG. 6.

As described above, in the present disclosure, before the normal mode starts after the LPTD mode, the lock signal LOCK transferred through the lock signal switching unit 320 may be quickly transferred to the controller 400, and thus, in the normal mode after the LPTD mode, the display panel may normally display an image.

The lock signal switching unit 320 performing the above-described function may be further included in at least one of the third and fourth data driver ICs 313 and 314. The lock signal switching unit further included in at least one of the third and fourth data driver ICs 313 and 314 may be referred to as a secondary lock signal switching unit 321.

That is, the secondary lock signal switching unit 321 which receives or blocks the lock signal LOCK may be further included in at least one of the third and fourth data driver ICs 313 and 314, and a configuration and a function of the secondary lock signal switching unit 321 may be the same as those of the lock signal switching unit 320.

Therefore, the secondary lock signal switching unit 321 may be the PMOSFET Tlock, and the PMOSFET Tlock may be turned on or off by the lock control signal LCS.

Delay of the lock signal LOCK supplied before the normal mode starts after the LPTD mode may be more reduced by the secondary lock signal switching unit 321, and thus, in the normal mode after the LPTD mode, the display panel may normally display an image.

Figure 7:
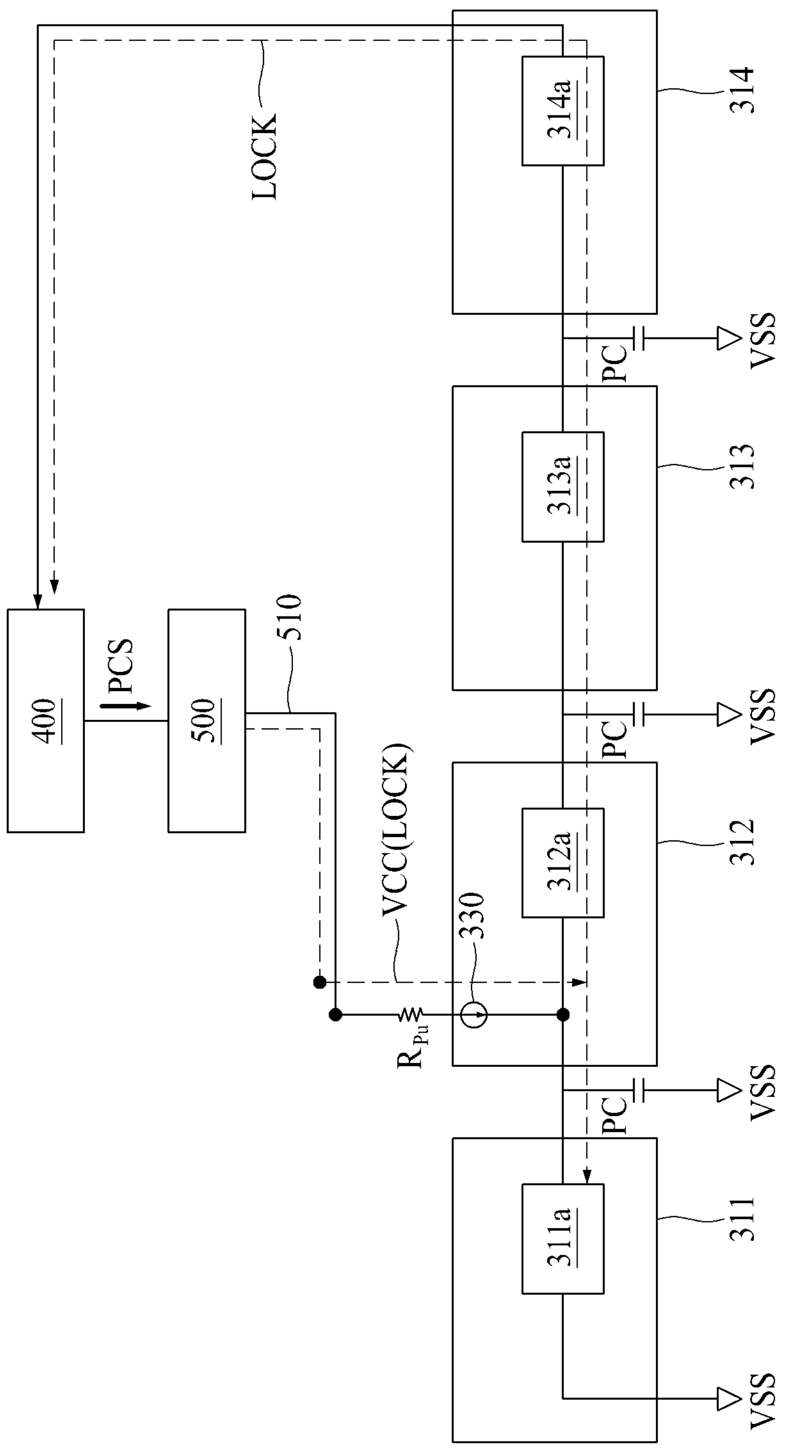
FIGS. 7 and 8 are other exemplary diagrams illustrating a structure of each of data driver ICs applied to a display apparatus according to the present disclosure.
Figure 8:
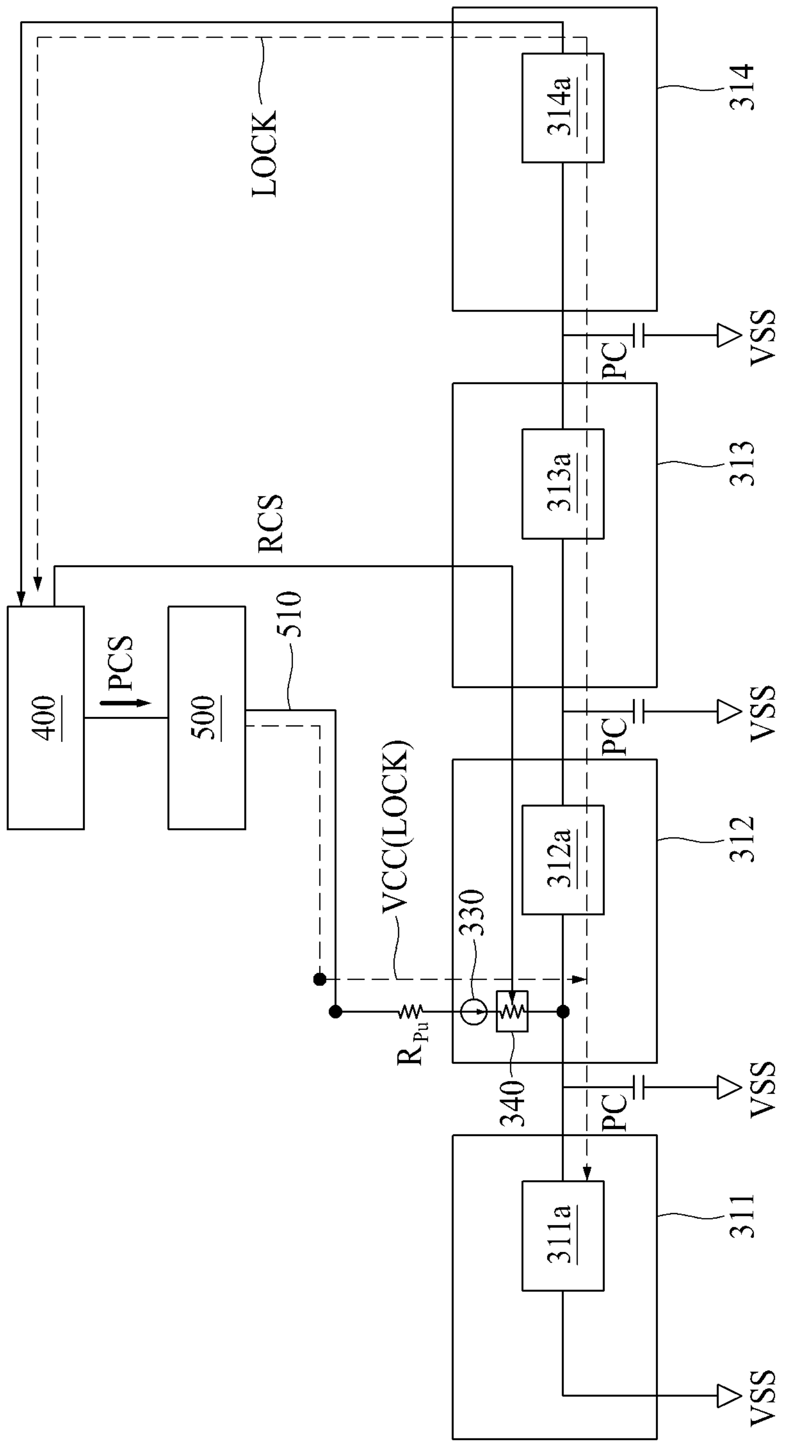

FIGS. 7 and 8 are other exemplary diagrams illustrating a structure of each of data driver ICs applied to a display apparatus according to the present disclosure. In the following description, details which are the same as or similar to details described above with reference to FIGS. 1 to 6 are omitted or will be briefly described.

The display apparatus according to the present disclosure may include a display panel 100 including data lines DL1 to DLd, first to $n^{th}$ data driver ICs 311 (where n is a natural number of more than 1) for supplying data voltages Vdata to the data lines DL1 to DLd, a controller 400 which controls the first to $n^{th}$ data driver ICs 311, and a power supply 500 which supplies power to the first to $n^{th}$ data driver ICs 311.

That is, the data driver 300 may include the first to $n^{th}$ data driver ICs 311. Hereinafter, for convenience of description, as illustrated in FIGS. 7 and 8, a display apparatus where four data driver ICs 310 are provided will be described as an example of the present disclosure. The four data driver ICs 310 may include first to fourth data driver ICs 311 to 314. That is, in the following description, n may be 4.

First, the present disclosure will be described with reference to FIG. 7.

A pull-up resistor Rpu may be provided between the second data driver IC 312 and a lock signal line 510 to which the lock signal LOCK is supplied from the power supply 500, and a current source 330 connected to the pull-up resistor Rpu may be included in the second data driver IC 312.

In this case, the lock signal LOCK supplied to the second data driver IC 312 may be transferred to the controller 400 through the first, third, and fourth data driver ICs 311, 313, and 314.

The amount of current of the lock signal LOCK may be increased by the current source 330, and thus, the lock signal LOCK supplied to the second data driver 312 may be quickly transferred to the controller 400.

Therefore, before the normal mode starts after the LPTD mode, the lock signal LOCK may be quickly transferred to the controller 400, and thus, in the normal mode after the LPTD mode, the display panel may normally display an image.

To provide an additional description, when the amount of current of the lock signal LOCK is increased by the current source 330, RC delay caused by a resistance and a parasitic capacitance occurring in a line through which the lock signal LOCK is transferred may be reduced, and thus, the lock signal LOCK may be quickly transferred.

Particularly, according to the present disclosure illustrated in FIG. 7, in addition to the lock signal LOCK supplied before the normal mode starts after the LPTD mode, a transfer speed of the lock signal LOCK supplied in the normal mode may all be enhanced.

In this case, a level of a current based on the current source 330 may be variously set based on a transfer speed of the lock signal LOCK supplied before the normal mode starts after the LPTD mode.

That is, a level of a current based on the current source 330 may be set based on a timing at which data voltages are initially output in the normal mode after the LPTD mode. According to a level of a current based on the current source 330 set based on a timing at which data voltages are initially output in the normal mode after the LPTD mode, delay of the lock signal LOCK supplied before the normal mode starts after the LPTD mode may not occur, and thus, in the normal mode after the LPTD mode, an image may be normally displayed.

Second, the present disclosure will be described with reference to FIG. 8.

The second data driver IC 312, as illustrated in FIG. 8, may include a variable resistor unit 340 which controls the amount of current passing through the current source 330.

The variable resistor unit 340 may be configured with a variable resistor.

A resistance value of the variable resistor unit 340 may be varied by a variable resistance control signal RCS transferred from the controller.

A resistance value of the variable resistor unit 340 before the normal mode starts after the LPTD mode may be less than that of the variable resistor unit 340 in the normal mode.

To this end, before the normal mode starts after the LPTD mode, the controller 400 may transfer, to the variable resistor unit 340, the variable resistance control signal RCS for reducing a resistance value of the variable resistor unit 340, and thus, a resistance value of the variable resistor unit 340 may be less than that of the variable resistor unit 340 in the normal mode.

Before the normal mode starts after the LPTD mode, when a resistance value of the variable resistor unit 340 is lowered, a current which is more than the amount of current flowing through the current source 330 and the variable resistor unit 340 in the normal mode may be transferred to the controller 440 through the second data driver IC 312.

Therefore, based on the principle described with reference to FIG. 7, the lock signal LOCK supplied before the normal mode starts after the LPTD mode may be more quickly transferred to the controller 400 than the lock signal LOCK which is supplied in the normal mode.

Therefore, in the normal mode after the LPTD mode, an image may be normally displayed.

To provide an additional description, as illustrated in FIG. 7, in the display apparatus including only the current source 330, in addition to a transfer speed of the lock signal LOCK supplied before the normal mode starts after the LPTD mode, a transfer speed of the lock signal LOCK supplied in the normal mode may also be enhanced. In this case, however, because the amount of totally supplied current increases, a power consumption amount of the display apparatus may more increase than a power consumption amount of the related art display apparatus.

However, in the display apparatus illustrated in FIG. 8, by varying a resistance value of the variable resistor unit 340, the amount of current of the lock signal LOCK supplied in the normal mode may be set to be less than the amount of current of the lock signal LOCK supplied before the normal mode starts after the LPTD mode. Accordingly, power consumption in the normal mode may be the same as that of the related art.

Moreover, the amount of current of the lock signal LOCK supplied before the normal mode starts after the LPTD mode may be set to be greater than the amount of current of the lock signal LOCK supplied in the normal mode, and thus, delay of the lock signal LOCK supplied before the normal mode starts after the LPTD mode may be reduced.

Therefore, in the normal mode after the LPTD mode, an image may be normally displayed.

Moreover, in the display apparatus according to the present disclosure, the current source 330 and the variable resistor unit 340 which perform the above-described functions may be further included in at least one of the first data driver IC 311, the third data driver IC 313, and the fourth data driver IC 314. A current source and a variable resistor unit which are further included in at least one of the first data driver IC 311, the third data driver IC 313, and the fourth data driver IC 314 may be respectively referred to as a secondary current source and a secondary variable resistor unit.

That is, a secondary current source connected to the lock signal line 510 receiving the lock signal LOCK and a secondary variable resistor unit for controlling the amount of current passing through the secondary current source may be included in at least one of the first data driver IC 311, the third data driver IC 313, and the fourth data driver IC 314.

Delay of the lock signal LOCK supplied before the normal mode starts after the LPTD mode may be more reduced by the secondary current source and the secondary variable resistor unit, and thus, in the normal mode after the LPTD mode, an image may be normally displayed.

Figure 9:
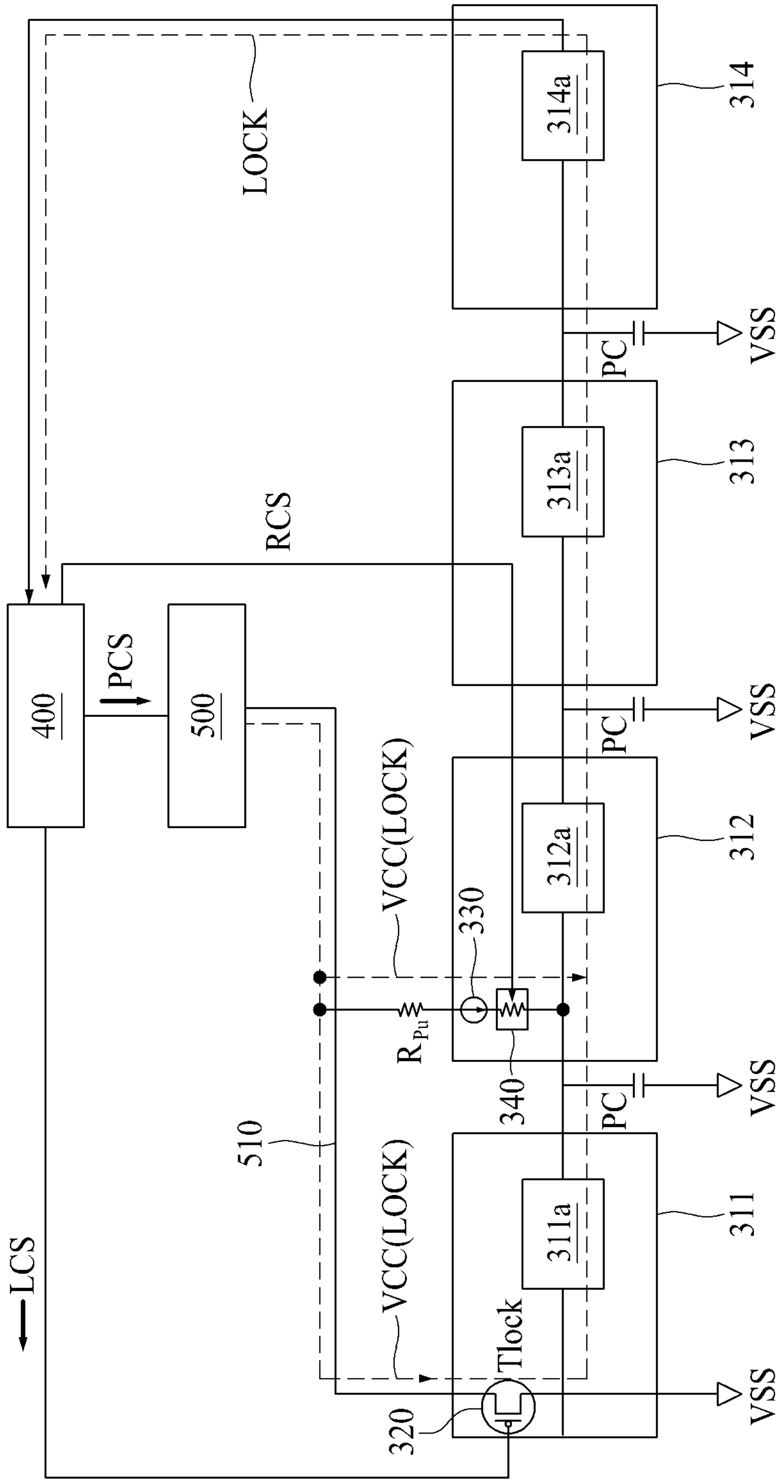
FIG. 9 is another exemplary diagram illustrating a structure of each of data driver ICs applied to a display apparatus according to the present disclosure.

FIG. 9 is another exemplary diagram illustrating a structure of each of data driver ICs applied to a display apparatus according to the present disclosure. In the following description, details which are the same as or similar to details described above with reference to FIGS. 1 to 8 are omitted or will be briefly described.

The lock signal switching unit 320 described above with reference to FIG. 5 and the current source 330 and the variable resistor unit 340 described above with reference to FIG. 8 may all be applied to one display apparatus.

That is, in the display apparatus according to the present disclosure, as illustrated in FIG. 9, a lock signal switching unit 320 may be included in a first data driver IC 311, and a current source 330 and a variable resistor unit 340 may be included in a second data driver IC 312.

Moreover, a secondary lock signal switching unit 321 may be further included in at least one of a third data driver IC 313 and a fourth data driver IC 314.

Moreover, a secondary current source and a secondary variable resistor unit may be further included in at least one of the third data driver IC 313 and the fourth data driver IC 314.

Moreover, the secondary lock signal switching unit 321 may be further included in the third data driver IC 313, and the secondary current source and the secondary variable resistor unit may be further included in the fourth data driver IC 314.

Moreover, the secondary current source and the secondary variable resistor unit may be further included in the third data driver IC 313, and the secondary lock signal switching unit 321 may be further included in the fourth data driver IC 314.

That is, in the present disclosure, delay of the lock signal LOCK supplied before the normal mode starts after the LPTD mode may be reduced by at least one of the data driver IC 310 including the lock signal switching unit 320 and the data driver IC 310 including the current source 330 and the variable resistor unit 340, and thus, in the normal mode after the LPTD mode, an image may be normally displayed.

Figure 10:
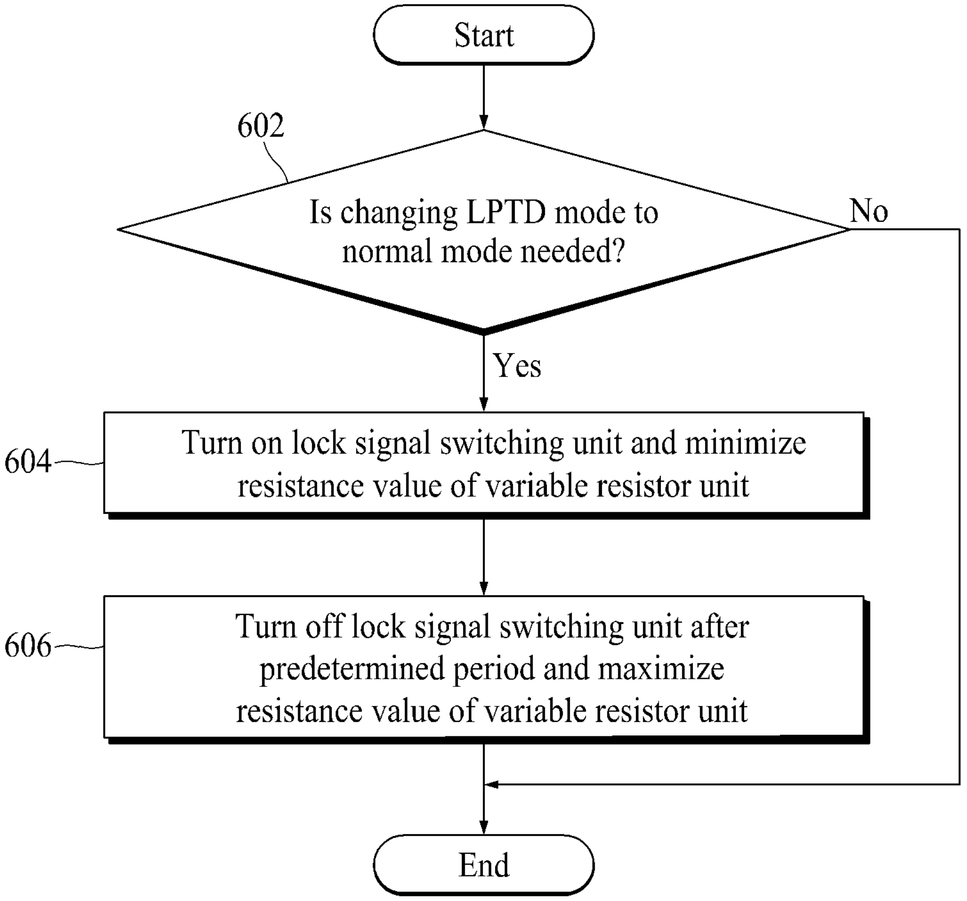
FIG. 10 is a flow chart illustrating a driving method of a display apparatus according to the present disclosure.

FIG. 10 is an exemplary diagram illustrating a driving method of a display apparatus according to the present disclosure. In the following description, details which are the same as or similar to details described above with reference to FIGS. 1 to 9 are omitted or will be briefly described.

First, when the display apparatus is turned on, a lock signal LOCK may be supplied to a second data driver IC 312 and may be transferred through an $n^{th}$ data driver IC.

When the lock signal LOCK is normally received, the normal mode may start, and thus, a display panel may display an image.

In the normal mode, the lock signal switching unit 320 illustrated in FIG. 5 may be turned off, and a resistance value of the variable resistor unit 340 illustrated in FIG. 8 may be a maximum value.

When pieces of image data or pieces of input image data corresponding to $n^{th}$ to $m^{th}$ gate lines are the same, a mode of the display apparatus may be changed from the normal mode to the LPTD mode.

In the LPTD mode, pieces of image data may not be transferred from a controller 400 to data driver ICs 310, and the data driver ICs 310 may continuously output data voltages which are stored in buffers. Accordingly, the same images may be displayed.

Subsequently, the controller 400 may determine whether pieces of image data (or input image data) corresponding to the $m^{th}$ gate line are the same as pieces of image data (or input image data) corresponding to the $m+1^{th}$ gate line (602).

That is, the controller 400 may determine whether to change the LPTD mode to the normal mode.

Subsequently, when it is determined that a mode of the display apparatus should be changed from the LPTD mode to the normal mode, the controller 400 may transfer a lock control signal LCS, which turns on a lock signal switching unit 320, to the lock signal switching unit 320 or may transfer a variable resistance control signal RCS, which allows a resistance value of the variable resistor unit 340 to be minimum, to the variable resistor unit 340.

Therefore, the lock signal switching unit 320 may be turned on, and a resistance value of the variable resistor unit 340 may be minimum (604).

In a state where the lock signal switching unit 320 is turned on or a resistance value of the variable resistor unit 340 is minimum, the lock signal LOCK may be transferred to the controller 400 through the data driver ICs 310, and then, an image may be displayed.

That is, in a state where the lock signal switching unit 320 is turned on or a resistance value of the variable resistor unit 340 is minimum, delay of the lock signal LOCK may be reduced, and thus, in the normal mode after the LPTD mode, an image may be normally displayed.

Finally, when a predetermined period elapses, the controller 400 may transfer the lock control signal LCS, which turns off the lock signal switching unit 320, to the lock signal switching unit 320 or may transfer the variable resistance control signal RCS, which allows a resistance value of the variable resistor unit 340 to be maximum, to the variable resistor unit 340.

Therefore, the lock signal switching unit 320 may be turned off, and a resistance value of the variable resistor unit 340 may be maximum (606).

Here, the predetermined period may be immediately after an image is displayed in the normal mode after the LPTD mode, or may be after at least several frames elapse in the normal mode after the LPTD mode.

A mode of the display apparatus in a state where the predetermined period elapses may be the normal mode.

In the normal mode, even when the lock signal is continuously transferred, the lock signal may not be delayed. Accordingly, an image may be normally displayed.

That is, according to the present disclosure, delay of the lock signal LOCK supplied before the normal mode starts after the LPTD mode may be prevented, thereby solving a problem where an image, displayed at a timing at which the LPTD mode is changed to the normal mode, is abnormally displayed.

To this end, in the present disclosure, before the normal mode starts after the LPTD mode, the lock signal switching unit 320 may be turned on or a resistance value of the variable resistor unit 340 may be minimum, and thus, delay of the lock signal LOCK may be minimized.

According to the present disclosure, a lock signal may be transferred through a PMOSFET where a transfer speed of a current is fast, and thus, delay of the lock signal may be prevented.

Moreover, according to the present disclosure, the amount of current of the lock signal may increase by using a current source, and thus, delay of the lock signal may be prevented.

That is, according to the present disclosure, delay of the lock signal transferred after the LPTD mode may be prevented. Accordingly, an image which should be output first after the LPTD mode may be normally output, and thus, the quality of a display apparatus may be enhanced.

The above-described feature, structure, and effect of the present disclosure are included in at least one aspect of the present disclosure, but are not limited to only one aspect. Furthermore, the feature, structure, and effect described in at least one aspect of the present disclosure may be implemented through combination or modification of other aspects by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display apparatus comprising:

a display panel including data lines;

data driver integrated circuits (ICs) supplying data voltages to the data lines, the data driver ICs including at least a first data driver IC and a second data driver IC;

a controller controlling the data driver ICs and receiving a lock signal to synchronize the data driver ICs based on an operating mode;

a power supply supplying power to the data driver ICs; and a pull-up resistor coupling the second data driver IC to a lock signal line to which the lock signal is supplied from the power supply, and wherein the first data driver IC comprises a lock signal switching unit receiving or blocking the lock signal from the power supply, wherein the lock signal that is supplied to the first data driver IC or the second data driver IC is sequentially transferred through the data driver ICs to the controller, and wherein, in a normal mode, the lock signal is transferred to the second data driver IC, in a low power Tx driving (LPTD) mode, the lock signal is not transferred to the data driver ICs, and before the normal mode starts after the LPTD mode, the lock signal is transferred to the first data driver IC and the second data driver IC.

2. The display apparatus of claim 1, wherein, in the normal mode, image data is transferred from the controller to the data driver ICs, and in the LPTD mode, image data is not transferred from the controller to the data driver ICs.

3. The display apparatus of claim 2, wherein, in the LPTD mode, the display panel displays same images.

4. The display apparatus of claim 1, wherein a transfer speed of the lock signal, transferred through the data driver ICs before the normal mode starts after the LPTD mode, is faster than a transfer speed of the lock signal transferred to the data driver ICs in the normal mode.

5. The display apparatus of claim 1, wherein the lock signal switching unit includes a P type metal oxide semiconductor field effect transistor (PMOSFET).

6. The display apparatus of claim 5, wherein the PMOSFET is turned on or off by a lock control signal transferred from the controller.

7. The display apparatus of claim 6, wherein the PMOSFET is turned on before a normal mode starts after the LPTD mode, in the normal mode, image data is transferred from the controller to the data driver ICs, and in a LPTD mode, image data is not transferred from the controller to the data driver ICs.

8. The display apparatus of claim 1, wherein a third data driver IC comprises a secondary lock signal switching unit receiving or blocking the lock signal.

9. The display apparatus of claim 8, wherein the secondary lock signal switching unit includes a P type metal oxide semiconductor field effect transistor (PMOSFET).

10. The display apparatus of claim 1, wherein the second data driver IC comprises:

a current source connected to the pull-up resistor; and a variable resistor unit controlling an amount of current passing through the current source.

11. The display apparatus of claim 10, wherein at least one of the third to $n^{th}$ data driver ICs comprises:

a secondary current source connected to a secondary pull-up resistor connected to a lock signal line receiving the lock signal; and a secondary variable resistor unit controlling an amount of current passing through the secondary current source.

12. The display apparatus of claim 10, wherein the variable resistor unit has a resistance value that is varied by a variable resistance control signal transferred from the controller.

13. The display apparatus of claim 12, wherein, before a normal mode starts after an LPTD mode, the variable resistor unit has a resistance value that is less than a resistance value of the variable resistor unit in the normal mode, in the normal mode, image data is transferred from the controller to the first to $n^{th}$ data driver ICs, and in the LPTD mode, image data is not transferred from the controller to the data driver ICs.

14. A display apparatus comprising:

a display panel including data lines;

data driver integrated circuits (ICs) supplying data voltages to the data lines, the data driver ICs including at least a first data driver IC and a second data driver IC;

a controller controlling the data driver ICs and receiving a lock signal to synchronize the data driver ICs based on an operating mode; and a power supply supplying power to the data driver ICs, wherein a pull-up resistor coupling the second data driver IC to a lock signal line to which the lock signal is supplied from the power supply, the second data driver IC comprises a current source connected to the pull-up resistor, and the lock signal that is supplied to the second data driver IC is transferred through the other data driver ICs to the controller, wherein the second data driver IC includes a variable resistor unit controlling an amount of current passing through the current source, wherein the variable resistor unit has a resistance value that is varied by a variable resistance control signal transferred from the controller, and wherein, before a normal mode starts after a low power Tx driving LPTD mode, the variable resistor unit has a resistance value that is less than a resistance value of the variable resistor unit in the normal mode, in the normal mode, image data is transferred from the controller to the data driver ICs, and in the LPTD mode, image data is not transferred from the controller to the data driver ICs.

15. The display apparatus of claim 14, wherein at least one of the first data driver IC and a third data driver ICs comprises:

a secondary current source connected to a secondary pull-up resistor connected to a lock signal line receiving the lock signal; and a secondary variable resistor unit controlling an amount of current passing through the secondary current source.

16. The display apparatus of claim 14, wherein the first data driver IC includes a lock signal switching unit receiving or blocking the lock signal.

17. The display apparatus of claim 1, wherein each of the data driver ICs are connected in series, wherein the first data driver IC is an initial data driver IC, and the second data driver IC is adjacent to the first data driver IC.

18. The display apparatus of claim 17, wherein a last data driver IC of the data driver ICs is connected to the controller for providing the lock signal to the controller.

19. The display apparatus of claim 1, wherein a current provided from the power supply via the pull-up resistor precharges the lock signal line to reduce a switching time of the operating mode of the display panel.

* * * * *